United States Patent
Shimura et al.

(10) Patent No.: US 10,359,237 B2
(45) Date of Patent: Jul. 23, 2019

(54) HEAT SOURCE MATERIAL COMPOSITION, AND AUXILIARY HEAT SOURCE AND HEAT SUPPLY METHOD USING THE SAME

(71) Applicant: FURUKAWA ELECTRIC CO., LTD., Tokyo (JP)

(72) Inventors: Takahiro Shimura, Tokyo (JP); Masami Ikeda, Tokyo (JP); Toshiaki Nakamura, Tokyo (JP); Yoshikazu Tsuzuki, Tokyo (JP); Tatsuya Minami, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/616,050

(22) Filed: Feb. 6, 2015

(65) Prior Publication Data

US 2015/0153110 A1 Jun. 4, 2015

Related U.S. Application Data

(63) Continuation of application No. PCT/JP2013/071259, filed on Aug. 6, 2013.

(30) Foreign Application Priority Data

Aug. 8, 2012 (JP) .................................. 2012-176537

(51) Int. Cl.
*C09K 5/00* (2006.01)
*F28D 20/02* (2006.01)
*C09K 5/06* (2006.01)

(52) U.S. Cl.
CPC .............. *F28D 20/02* (2013.01); *C09K 5/063* (2013.01); *Y02E 60/145* (2013.01)

(58) Field of Classification Search
None
See application file for complete search history.

(56) References Cited

U.S. PATENT DOCUMENTS

| 4,415,465 A | 11/1983 | Koike et al. |
| 4,503,838 A * | 3/1985 | Arrhenius ............. C09K 5/063 126/263.03 |
| 4,574,051 A | 3/1986 | Matthews et al. |
| 5,402,650 A * | 4/1995 | Stewart, Jr. ............ C09K 5/063 62/347 |
| 2002/0177886 A1 | 11/2002 | Sharma et al. |
| 2008/0011978 A1 * | 1/2008 | Kawaguchi .............. C09K 5/10 252/69 |

FOREIGN PATENT DOCUMENTS

| CN | 101519582 A | 9/2009 |
| JP | 53-14173 A | 2/1978 |
| JP | 57-149380 A | 9/1982 |
| JP | 58-79081 A | 5/1983 |
| JP | 60-144380 A | 7/1985 |
| JP | 61-14283 A | 1/1986 |
| JP | 62-205184 A | 9/1987 |
| JP | 63-137982 A | 6/1988 |
| JP | 2-92986 A | 4/1990 |
| JP | 4-324092 A | 11/1992 |
| JP | 2001-31956 A | 2/2001 |
| JP | 2001-139939 A | 5/2001 |
| JP | 2007-112865 A | 5/2007 |

OTHER PUBLICATIONS

International Search Report issued in PCT/JP2013/071259, dated Nov. 19, 2013.
Extended European Seach Report for European Application No. 13827590.4, dated Mar. 3, 2016.
Chinese Office Action and Search Report, dated Sep. 29, 2016, for Chinese Application No. 201380038811.4.
Ningning et al., "Research on the organic phase change material for energy storage," New Chemical Materials, vol. 37, No. 4, Apr. 30, 2009, pp. 87-88.

* cited by examiner

*Primary Examiner* — Necholus Ogden, Jr.
(74) *Attorney, Agent, or Firm* — Birch, Stewart, Kolasch & Birch, LLP

(57) ABSTRACT

A heat storage material composition, at least containing at least one organic compound selected from ethanol, ethylene glycol, propylene glycol, and acetic acid, sodium acetate, and water, wherein a content of the water is 72.4 to 100 parts by mass, relative to 100 parts by mass of the sodium acetate; an auxiliary heat source and a heat supply method, using the heat storage material composition.

7 Claims, No Drawings

HEAT SOURCE MATERIAL COMPOSITION, AND AUXILIARY HEAT SOURCE AND HEAT SUPPLY METHOD USING THE SAME

CROSS-REFERENCE TO RELATED APPLICATIONS

This application is a Continuation of PCT International Application No. PCT/JP2013/071259 filed on Aug. 6, 2013, which claims priority under 35 U.S.C. § 119 (a) to Japanese Patent Application No. 2012-176537 filed on Aug. 8, 2012. Each of the above applications is hereby expressly incorporated by reference, in its entirety, into the present application.

TECHNICAL FIELD

The present invention relates to a heat storage material composition, particularly a supercooling heat storage material composition, and an auxiliary heat source and a heat supply method using the heat storage material composition. More specifically, the present invention relates to a supercooling heat storage material composition containing sodium acetate as a main component, and an auxiliary heat source and a heat supply method using the heat storage material composition.

BACKGROUND ART

A heat storage material, particularly a supercooling latent heat storage material, utilizes the heat to absorb and dissipate a large amount of latent heat at a certain temperature, during the process of melting and solidification. A heat storage material containing sodium acetate trihydrate as a main material is used for heating and calefaction in a medium temperature region, and a heat storage material containing sodium sulfate decahydrate as a main material is used for cooling and refrigeration in a low temperature region.

However, when simple sodium acetate trihydrate is used as a main material, thermal energy storage stability is deteriorated. This is because precipitation of anhydrous sodium acetate (anhydrate) that does not function as a heat storage material occurs, and when the material is repeatedly used, the effect of this anhydrate is further increased. Thus, various measures for preventing this precipitation have been investigated.

For example, a method of gelling a heat storage material by adding xanthan gum, which is one kind of polysaccharides (see Patent Literature 1), and addition of water (see Patent Literatures 2 and 3) have been proposed. However, when it is required to use the heat storage material at a temperature far lower than −20° C., for example, in automotive applications, when it is required for the heat storage material to maintain a supercooled state at a temperature near −30° C. and to retain thermal energy storage stability, these methods have been not necessarily satisfactory. In the case of the addition of xanthan gum, the crystallization temperature does not drop that much, while in the case of the addition of water, there is a problem that if the amount of addition is small, the crystallization temperature is high; and if the amount of addition is large, the amount of heat dissipation is small. Furthermore, a method of adding sodium thiosulfate pentahydrate as a means for maintaining a supercooled state at a low temperature (see Patent Literature 4) has also been proposed; however, the method has a problem that the rate of crystallization is slow.

CITATION LIST

Patent Literatures

Patent Literature 1: JP-A-60-144380 ("JP-A" means unexamined published Japanese patent application)
Patent Literature 2: JP-A-53-14173
Patent Literature 3: JP-A-4-324092
Patent Literature 4: JP-A-63-137982

SUMMARY OF INVENTION

Technical Problem

The present invention is contemplated for overcoming the problems described above, and for providing a heat storage material composition, which has high thermal energy storage stability even at a temperature near −20° C., which retains the energy of a latent heat portion generated by a supercooled state, even at room temperature, and which immediately enables heat utilization at any arbitrary time point; and for providing an auxiliary heat source and a heat supply method using the heat storage material composition.

Solution to Problem

The inventors of the present invention considered using a supercooling heat storage material as an auxiliary heat source for automotive applications, and repeatedly conducted investigations. As a result, the inventors conducted investigations on various heat storage material compositions which can lower the spontaneous initiation temperature in order to maintain a supercooled state even at a temperature at least near −25° C. or less, and can rapidly increase the temperature in order to enable utilization at any arbitrary time point, that is, in order to accelerate the rate of crystallization and to realize an increase in the amount of heat dissipation.

The task described above was achieved by the following means.

(1) A heat storage material composition, at least containing at least one organic compound selected from ethanol, ethylene glycol, propylene glycol, and acetic acid, sodium acetate, and water, wherein a content of the water is 72.4 to 100 parts by mass relative to 100 parts by mass of the sodium acetate.

(2) The heat storage material composition described in (1), wherein a content of the organic compound is, in the case of ethanol, 9.6 to 77.9 parts by mass; in the case of ethylene glycol, 5.6 to 45.5 parts by mass; in the case of propylene glycol, 9.6 to 45.5 parts by mass; and in the case of acetic acid, 9.6 to 38.6 parts by mass, relative to 100 parts by mass of the sodium acetate.

(3) The heat storage material composition described in (1), wherein a content of the organic compound is, in the case of ethanol, 20.2 to 77.9 parts by mass; in the case of ethylene glycol, 5.6 to 45.5 parts by mass; in the case of propylene glycol, 9.6 to 45.5 parts by mass; and in the case of acetic acid, 9.6 to 26.0 parts by mass, relative to 100 parts by mass of the sodium acetate.

(4) The heat storage material composition described in any one of (1) to (3), wherein the content of water is 78.6 to 85.2 parts by mass, relative to 100 parts by mass of the sodium acetate.

(5) The heat storage material composition described in any one of (1) to (4), wherein the heat storage material composition is consisted of the organic compound, the sodium acetate, and the water.

(6) The heat storage material composition described in any one of (1) to (5), wherein the organic compound in the heat storage material composition is composed only of any one organic compound selected from ethanol, ethylene glycol, propylene glycol, and acetic acid.

(7) An auxiliary heat source, characterized by being obtainable from the heat storage material composition described in any one of (1) to (6).

(8) A heat supply method, characterized by using the heat storage material composition described in any one of (1) to (6).

(9) The heat supply method described in (8), wherein the method is combined with a crystallization accelerating means.

(10) The heat supply method described in (9), wherein the crystallization accelerating means is a metal plate trigger.

Advantageous Effects of Invention

According to the present invention, there can be provided: a heat storage material composition, which has high thermal energy storage stability at least near −20° C., which retains the energy of a latent heat portion generated by a supercooled state even at room temperature, and which immediately enables heat utilization at an arbitrary time point; and an auxiliary heat source and a heat supply method using the heat storage material composition.

The above-mentioned and other features and advantages of the present invention will be apparent from the following description.

DESCRIPTION OF EMBODIMENTS

Hereinafter, the heat storage material composition of the present invention, and the auxiliary heat source and the heat supply method using the heat storage material composition, will be described. In addition, in the present invention, A to B parts by mass means a range of from A parts by mass to B parts by mass. For example, 72.4 to 100 parts by mass indicates from 72.4 parts by mass to 100 parts by mass.
<<Heat Storage Material Composition>>

The heat storage material composition of the present invention at least contains at least one organic compound selected from ethanol, ethylene glycol, propylene glycol, and acetic acid; sodium acetate; and water, and the content of the water is 72.4 to 100 parts by mass, relative to 100 parts by mass of the sodium acetate.

Regarding the method for obtaining the composition, there are two methods available, including: 1) a method of mixing at least one organic compound selected from ethanol, ethylene glycol, propylene glycol, and acetic acid, sodium acetate trihydrate, and water; 2) a method of mixing at least one organic compound selected from ethanol, ethylene glycol, propylene glycol, and acetic acid, anhydrous sodium acetate, and water; however, any of these methods may be used. In the case of 1), when the portion of sodium acetate of the sodium acetate trihydrate is designated as 100 parts by mass, the portion of water defined as the sum of the water and the water part of the sodium acetate trihydrate, is contained in an amount of 72.4 to 100 parts by mass. Preferably, the method 1) of using sodium acetate trihydrate is utilized. Furthermore, known additive materials may be added in accordance with the purpose, to the extent that the characteristics of the heat storage material (spontaneous crystallization initiation temperature, rate of crystallization, and amount of heat dissipation) are not markedly impaired. For example, a thickening agent may be added to the composition of the present invention to adjust the viscosity of the heat storage material, or the viscosity may be increased to obtain a gel phase.

Water is preferably pure water, and the content of water is preferably 72.4 to 100 parts by mass, more preferably 78.6 to 85.2 parts by mass, and particularly preferably 81.8 parts by mass, relative to 100 parts by mass of the sodium acetate.

The content of ethanol is preferably 9.6 to 77.9 parts by mass, and more preferably 20.2 to 77.9 parts by mass, relative to 100 parts by mass of the sodium acetate.

The content of ethylene glycol and propylene glycol is preferably 5.6 to 45.5 parts by mass, and more preferably 9.6 to 45.5 parts by mass, relative to 100 parts by mass of the sodium acetate.

The content of acetic acid is preferably 9.6 to 38.6 parts by mass, more preferably 9.6 to 26.0 parts by mass, and particularly preferably 14.7 parts by mass, relative to 100 parts by mass of the sodium acetate.

The heat storage material composition of the present invention is preferably composed only of sodium acetate, water, and the organic compound, and it is more preferable that the organic compound be only any one organic compound selected from ethanol, ethylene glycol, propylene glycol, and acetic acid.

The heat storage material composition of the present invention has a spontaneous crystallization initiation temperature of −20° C. or less, preferably −25° C. or less, more preferably −28° C. or less, even more preferably −30° C. or less, and particularly preferably −40° C. or less.

Furthermore, the rate of crystallization is preferably 0.6 mm/s or more, more preferably 1.4 mm/s or more, and even more preferably 2.0 mm/s or more. The upper limit of the rate of crystallization is not particularly limited, but the upper limit is practically 7.0 mm/s or less.

Furthermore, the amount of heat dissipation is preferably 130 kJ/kg or more, more preferably 140 kJ/kg or more, and even more preferably 150 kJ/kg or more. Meanwhile, the upper limit of the amount of heat dissipation cannot exceed 264 kJ/kg, which is the amount of heat dissipation of sodium acetate trihydrate itself, and this value is the upper limit.

Herein, the spontaneous crystallization initiation temperature, the rate of crystallization, and the amount of heat dissipation can be determined as follows.
(Measurement of Spontaneous Crystallization Initiation Temperature)

4 g of each sample (heat storage material) is enclosed in a sealed container, melted at 80° C., and then cooled to room temperature, to be a supercooled state. Then, a thermocouple is attached thereto, and the sealed container is placed in a thermostat chamber. The temperature of the atmosphere is lowered at a rate of, for example, about 0.7° C./min, and the sample is cooled to −40° C. The temperature change of the heat storage material is monitored with the thermocouple, and the temperature at which a rapid temperature increase caused by crystallization occurs can be determined as the spontaneous crystallization initiation temperature.
(Measurement of Rate of Crystallization)

22 mL of a heat storage material and a metal plate trigger (a stainless steel plate having small slits carved thereinto) are enclosed in a sealed container with size of 60 mm×160 mm×3 mm, and the sealed container is left to stand at −10° C. The temperature profile of the heat storage material sample is measured with a thermocouple by operating the trigger, and at the time point when the temperature begins to rise, the crystallization initiation time instants at various measurement points is defined. The crystallization proceed time period is determined from the time difference in the crystallization initiation time instants between a distance of 100 mm, thereby the ratio of crystallization proceed distance/crystallization proceed time period is calculated, and this is designated as the rate of crystallization (mm/s).

(Measurement of Amount of Heat Dissipation)

Water at 25° C. is introduced into a water tank that is thermally-insulated around the periphery, and the sample used for the measurement of the rate of crystallization, which was 22 mL of the heat storage material and the metal plate trigger enclosed in a sealed container with a size of 60 mm×160 mm×3 mm, is placed in the water. Inside this water tank, the trigger is operated, and the temperature rise of water temperature is measured with a plurality of thermocouples, for example, twelve thermocouples. The water tank is shaken so that the water temperatures at the various measurement points become uniform, and thereby the water temperature is made uniform, and the temperature rise value is determined from an average value obtained from the twelve points. The density of water is defined as 1 g/cm$^3$, the specific heat is defined as 4.2 J/g·° C., and the amount of heat received by the water is calculated from the mass of water and the temperature rise value for each measurement. The value obtained by dividing the mass of the heat storage material sample by the amount of heat is determined as the amount of heat dissipation of the heat storage material per unit mass (kJ/kg).

In the heat storage material composition of the present invention, water molecules in a supercooled liquid are incorporated into the molecules of sodium acetate, and crystallization occurs. As a result, water molecules are incorporated into the crystal lattice of sodium acetate. As such, latent heat is released as crystallization occurs. However, it is presumed that since water molecules are in a state of being more easily incorporated at a low temperature, the molecules of a polar organic compound, such as ethanol, attract water molecules through hydrogen bonding, and thereby the polar organic compound suppresses crystallization of sodium acetate trihydrate.

According to the present invention, as a result of adding the organic compound, the rate of crystallization becomes faster than that of the known technology involving addition of sodium thiosulfate pentahydrate described above, and the amount of heat dissipation is larger than that of the known technology involving addition of water described above.

<<Auxiliary Heat Source>>

The heat storage material composition of the present invention can be used as an auxiliary heat source of a heat storage system.

Examples of such a heat storage system include a heat pump-type water heater, a solar heat water heater, an electric vehicle (EV) or an automobile, and floor heating.

In a heat pump-type water heater, heat is stored by means of midnight power, and the heat can be used the next day. Also, since heat can be stored at a high heat storage density, size reduction of the heated water storage tank is made possible.

In a solar heat water heater, solar heat is stored in the daytime, and hot water supply can be used in the night.

In an electric vehicle (EV) or an automobile, waste heat of the engine, motor, heating water after parking, and the like can be stored, or can be used in heating by energization of a heater from a power supply for charging, thermal insulation of batteries, engine warming up, thermal insulation of lubricant oil, and thermal insulation of washer liquid.

In floor heating, heat storage using midnight power is made possible.

Also, the heat storage material may also be utilized as a heat storage material-included package unit.

Examples thereof include a thermal battery, a heat source for emergency, and a disposable heating pocket warmer.

In a thermal battery, waste heat generated in plants, data center, stores, and the like is packaged, and the waste heat can be utilized at a place distant from a heat source by operating a trigger.

A heat source for emergency and a disposable heating pocket warmer can be utilized as heat sources in a state or place lacking electric power, by combining the heat source or the pocket warmer with a trigger that can be manually operated.

<<Heat Supply Method>>

A heat supply method can be provided, as a heat storage system or a heat storage material-included package unit such as described above, by using the heat storage material composition of the present invention.

Particularly, in order to immediately supply heat utilization at an arbitrary time point, it is preferable to combine the heat storage material composition with a crystallization acceleration means (e.g. a supercooling relieving means, a trigger device).

Examples of the crystallization acceleration means include a seed crystal, a metal plate (a metal plate flip), voltage application, local cooling, and application of vibration, and for example, the means described in JP-A-2011-75050 may be used, which are also preferable for the present invention. Among these, it is preferable to use a seed crystal or a metal plate (a metal plate flip), and a metal plate (a metal plate flip) is particularly preferred. Such a metal plate is specifically a stainless steel disk with diameter 20 mm and thickness 0.2 mm, which is provided with cracks each with length of 3 mm at 12 sites, and is bent at the center to a height of about 1 mm. The metal plate is not intended to be limited to this shape, and for example, the shapes described in the specification of U.S. Pat. No. 4,379,448 may also be used.

The heat supply apparatus is applied to the apparatuses described in, for example, JP-A-2011-75050, JP-A-2010-196508, JP-A-2009-264155, JP-A-2009-236433, JP-A-63-105219, JP-A-63-68418, JP-A-62-172190, JP-A-61-22194, Japanese Patent Application No. 2012-061476, and Japanese Patent Application No. 2012-061477.

Examples

The present invention will be described in more detail based on examples given below, but the invention is not meant to be limited by these.

Example 1

Various heat storage material samples each having a total amount of heat storage material of 4 g were produced with the heat storage material compositions of Table 1.

The following items of these samples were measured.

(Measurement of Spontaneous Crystallization Initiation Temperature)

4 g of each sample (heat storage material) was enclosed in a sealed container, melted at 80° C., and then cooled to room temperature, to be a supercooled state. Then, a thermocouple was attached thereto, and the sealed container was placed in a thermal chamber. The temperature of the atmosphere was lowered at a rate of, for example, about 0.7° C./min, and the sample was cooled to −40° C. The temperature change of the heat storage material was monitored with the thermocouple, and the temperature at which a rapid temperature rise caused by crystallization occurred was determined as the spontaneous crystallization initiation temperature.

(Measurement of Rate of Crystallization)

22 mL of a heat storage material and a metal plate trigger (a stainless steel disk with diameter 20 mm and thickness 0.2 mm, provided with cracks each having a length of 3 mm at twelve sites, and bent at the center to a height of about 1 mm) were enclosed in a sealed container with a size of 60 mm×160 mm×3 mm, and the sealed container was left to stand at −10° C. The temperature profile of the heat storage material sample was measured with a thermocouple by operating the trigger, and at the time point when the temperature began to rise, the crystallization initiation time instants at various measurement points was defined. The crystallization proceed time period was determined from the time difference in the crystallization initiation time instants between a distance of 100 mm, thereby the ratio of crystallization proceed distance/crystallization proceed time period was calculated, and this is designated as the rate of crystallization (mm/s).

(Measurement of Amount of Heat Dissipation)

Water at 25° C. was introduced into a water tank that was thermally-insulated around the periphery, and the sample used for the measurement of the rate of crystallization, which was 22 mL of the heat storage material and the metal plate trigger enclosed in the sealed container with a size of 60 mm×160 mm×3 mm, was placed in the water. Inside this water tank, the trigger was operated, and the temperature rise of water temperature was measured with twelve thermocouples. The water tank was shaken so that the water temperatures at the various measurement points became uniform, and thereby the water temperature was made uniform, and the temperature rise value was determined from an average value obtained from the twelve points. The density of water is defined as 1 g/cm$^3$, the specific heat of water is defined as 4.2 J/g·° C., and the amount of heat received by the water was calculated from the mass of water and the temperature rise value for each measurement. The value obtained by dividing the mass of the heat storage material sample by the amount of heat was determined as the amount of heat dissipation of the heat storage material per unit mass (kJ/kg).

Herein, Sample Nos. 1 to 3 are Comparative examples, and among these, Sample No. 2 is a sample described in JP-A-4-324092.

The results thus obtained are summarized in Table 1.

TABLE 1

| Sample No. | Blending amounts of composition components (mass parts) | | | Spontaneous crystallization initiation temperature [° C.] | Rate of crystallization [mm/s] | Amount of heat dissipation [kJ/kg] | Remarks |
|---|---|---|---|---|---|---|---|
| | Blending amount of sodium acetate | Blending amount of water | Blending amount of additive | | | | |
| 1 | 100 | 81.8 | — | −14 | 6.3 | 163 | Comparative example |
| 2 | 100 | 115.7 | — | <−40 | 2.9 | 94 | Comparative example |
| 3 | 100 | 86.0 | Sodium thiosulfate 35.2 | <−40 | 0.3 | 140 | Comparative example |
| 4 | 100 | 81.8 | Ethanol 45.5 | <−40 | 1.4 | 140 | This invention |
| 5 | 100 | 81.8 | Propylene glycol 9.6 | −33 | 2.3 | 153 | This invention |
| 6 | 100 | 81.8 | Ethylene glycol 9.6 | −29 | 2.0 | 139 | This invention |
| 7 | 100 | 81.8 | Acetic acid 14.7 | −32 | 2.4 | 146 | This invention |
| 8 | 100 | 70.0 | Ethanol 45.0 | −17 | 1.1 | 105 | Comparative example |
| 9 | 100 | 105.0 | Ethanol 45.5 | −16 | 1.0 | 145 | Comparative example |

From Table 1, in regard to Sample Nos. 1 to 3, which are prior art techniques, shown as comparative examples, Sample 1 exhibited a fast rate of crystallization and an amount of heat dissipation at a satisfactory level; however, the spontaneous crystallization initiation temperature was −14° C., which was higher than −20° C. In Sample No. 2, the spontaneous crystallization initiation temperature was −40° C. or less, and the rate of crystallization was at a satisfactory level; however, the amount of heat dissipation was as small as 94 kJ/kg. Furthermore, in Sample No. 3, the spontaneous crystallization initiation temperature was −40° C. or less, and the amount of heat dissipation was 140 kJ/kg, which was not so small; however, the rate of crystallization was 0.30 mm/s.

On the contrary, in Sample Nos. 4 to 7 according to the present invention, the spontaneous crystallization initiation temperatures were all low, such as about −20° C. or less, and the rate of crystallization and the amount of heat dissipation each were also at a satisfactory level.

In Sample Nos. 8 and 9 of comparative examples, the spontaneous crystallization initiation temperature was higher than −20° C.

Example 2

The dependency on the amount of addition of ethanol was evaluated.

The thus-obtained results are shown in Table 2.

TABLE 2

| Sample No. | Blending amounts of composition components (mass parts) | | | Spontaneous crystallization initiation temperature °C. |
|---|---|---|---|---|
| | Blending amount of sodium acetate | Blending amount of water | Blending amount of ethanol | |
| 101 | 100 | 81.8 | 1.8 | −21 |
| 102 | 100 | 81.8 | 9.6 | −26 |
| 103 | 100 | 81.8 | 20.2 | −35 |
| 104 | 100 | 81.8 | 32.1 | <−40 |
| 105 | 100 | 81.8 | 45.5 | <−40 |
| 106 | 100 | 81.8 | 77.9 | <−40 |
| 107 | 100 | 81.8 | 80.1 | <−40 |

Sample 105 is the sample equivalent to Sample 4 of Table 1.

Herein, the rate of crystallization of each of Sample Nos. 102, 104, and 105 was 2.9 mm/s, 1.6 mm/s, and 1.4 mm/s, respectively.

In Sample Nos. 102 to 107, the spontaneous crystallization initiation temperature was −25° C. or less.

In Sample Nos. 101 to 106, the rate of crystallization was 0.6 mm/sec or more, and the amount of heat dissipation was 130 kJ/kg or more.

In Sample No. 107, the rate of crystallization was less than 0.6 mm/sec, and the amount of heat dissipation was less than 130 kJ/kg.

Example 3

The dependency on the amount of addition of ethylene glycol was evaluated in the same manner as in Example 2.

The thus-obtained results are shown in Table 3.

TABLE 3

| Sample No. | Blending amounts of composition components (mass parts) | | | Spontaneous crystallization initiation temperature [° C.] |
|---|---|---|---|---|
| | Blending amount of sodium acetate | Blending amount of water | Blending amount of ethylene glycol | |
| 201 | 100 | 81.8 | 1.8 | −17 |
| 202 | 100 | 81.8 | 5.6 | −28 |
| 203 | 100 | 81.8 | 9.6 | −29 |
| 204 | 100 | 81.8 | 13.7 | −36 |
| 205 | 100 | 81.8 | 20.2 | <−40 |
| 206 | 100 | 81.8 | 32.1 | <−40 |
| 207 | 100 | 81.8 | 45.5 | <−40 |
| 208 | 100 | 81.8 | 47.8 | <−40 |

In Sample Nos. 202 to 208, the spontaneous crystallization initiation temperature was −25° C. or less. In Sample No. 201, the spontaneous crystallization initiation temperature was higher than −25° C.

In Sample Nos. 201 to 207, the rate of crystallization was 0.6 mm/sec or more. In Sample No. 208, the rate of crystallization was less than 0.6 mm/sec.

In Sample Nos. 201 to 208, the amount of heat dissipation was 130 kJ/kg or more.

Example 4

The dependency on the amount of addition of propylene glycol was evaluated in the same manner as in Example 2.

The thus-obtained results are shown in Table 4.

TABLE 4

| Sample No. | Blending amounts of composition components (mass parts) | | | Spontaneous crystallization initiation temperature [° C.] |
|---|---|---|---|---|
| | Blending amount of sodium acetate | Blending amount of water | Blending amount of propylene glycol | |
| 301 | 100 | 81.8 | 1.8 | −21 |
| 302 | 100 | 81.8 | 5.6 | −20 |
| 303 | 100 | 81.8 | 9.6 | −32 |
| 304 | 100 | 81.8 | 13.7 | −29 |
| 305 | 100 | 81.8 | 20.2 | −28 |
| 306 | 100 | 81.8 | 32.1 | <−40 |
| 307 | 100 | 81.8 | 45.5 | <−40 |
| 308 | 100 | 81.8 | 47.5 | <−40 |

In Sample Nos. 303 to 308, the spontaneous crystallization initiation temperature was −25° C. or less.

In Sample Nos. 301 to 307, the rate of crystallization was 0.6 mm/sec or more. In Sample No. 308, the rate of crystallization was less than 0.6 mm/sec.

In Sample Nos. 301 to 308, the amount of heat dissipation was 130 kJ/kg or more.

Example 5

The dependency on the amount of addition of acetic acid was evaluated in the same manner as in Example 2.

The thus-obtained results are shown in Table 5.

TABLE 5

| Sample No. | Blending amounts of composition components (mass parts) | | | Spontaneous crystallization initiation temperature [° C.] |
|---|---|---|---|---|
| | Blending amount of sodium acetate | Blending amount of water | Blending amount of acetic acid | |
| 401 | 100 | 81.8 | 4.7 | −20 |
| 402 | 100 | 81.8 | 9.6 | −26 |
| 403 | 100 | 81.8 | 14.7 | −32 |
| 404 | 100 | 81.8 | 26.0 | −26 |
| 405 | 100 | 81.8 | 38.6 | −25 |
| 406 | 100 | 81.8 | 40.3 | −23 |

In Sample Nos. 402 to 405, the spontaneous crystallization initiation temperature was −25° C. or less. In Sample Nos. 401 and 406, the spontaneous crystallization initiation temperature was higher than −25° C.

As described above, according to the present invention, a heat storage material composition, which is high in thermal energy storage stability at least at a temperature near −20° C.; which retains the energy of a latent heat portion generated by a supercooled state, even at room temperature; and which immediately enables heat utilization at any arbitrary time point, can be obtained. Thereby, an auxiliary heat source and a heat supply method, each using the heat storage material composition, can be provided.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A heat storage material composition, consisting of:
   (a) an organic compound consisting of ethanol, ethylene glycol, propylene glycol, or acetic acid,
   (b) sodium acetate, and
   (c) water,
   wherein a content of the water is 78.6 to 85.2 parts by mass relative to 100 parts by mass of the sodium acetate, and wherein a rate of crystallization is 0.6 mm/s or more, and
   wherein the heat storage material composition has a spontaneous crystallization initiation temperature of −20° C. or less, and
   wherein a content of the organic compound is, in the case of ethanol, 9.6 to 77.9 parts by mass; in the case of ethylene glycol, 32.1 to 45.5 parts by mass; in the case of propylene glycol, 9.6 to 45.5 parts by mass; and in the case of acetic acid, 9.6 to 38.6 parts by mass, relative to 100 parts by mass of the sodium acetate.

2. The heat storage material composition according to claim 1, wherein a content of the organic compound is, in the case of ethanol, 20.2 to 77.9 parts by mass; in the case of ethylene glycol, 32.1 to 45.5 parts by mass; in the case of propylene glycol, 9.6 to 45.5 parts by mass; and in the case of acetic acid, 9.6 to 26.0 parts by mass, relative to 100 parts by mass of the sodium acetate.

3. The heat storage material composition according to claim 1, wherein the heat storage material composition consists of the organic compound, the sodium acetate, and the water.

4. An auxiliary heat source, characterized by being obtainable from the heat storage material composition according to claim 1.

5. A heat supply method, characterized by using the heat storage material composition according to claim 1.

6. The heat supply method according to claim 5, wherein the method is combined with a crystallization accelerating means.

7. The heat supply method according to claim 6, wherein the crystallization accelerating means is a metal plate trigger.

* * * * *